United States Patent
Wong et al.

(10) Patent No.: US 12,442,108 B2
(45) Date of Patent: Oct. 14, 2025

(54) PROTECTIVE MASKS MADE WITH POLYMER-BASED MATERIALS

(71) Applicant: NANOSHIELDS TECHNOLOGY LIMITED, Hong Kong (CN)

(72) Inventors: Siu Wah Wong, Hong Kong (CN); Ho Wang Tong, Hong Kong (CN); Chi Hang Yu, Hong Kong (CN); Yu Hang Leung, Hong Kong (CN); Wing Man Chan, Hong Kong (CN)

(73) Assignee: NANOSHIELDS TECHNOLOGY LIMITED, Hong Kong (CN)

( * ) Notice: Subject to any disclaimer, the term of this patent is extended or adjusted under 35 U.S.C. 154(b) by 122 days.

(21) Appl. No.: 18/560,413

(22) PCT Filed: May 18, 2022

(86) PCT No.: PCT/CN2022/093561
§ 371 (c)(1),
(2) Date: Nov. 13, 2023

(87) PCT Pub. No.: WO2022/257716
PCT Pub. Date: Dec. 15, 2022

(65) Prior Publication Data
US 2024/0150937 A1    May 9, 2024

Related U.S. Application Data

(60) Provisional application No. 63/202,379, filed on Jun. 9, 2021.

(51) Int. Cl.
*B29C 48/15*    (2019.01)
*A41D 13/11*    (2006.01)
(Continued)

(52) U.S. Cl.
CPC .......... *D01D 5/0038* (2013.01); *A41D 13/11* (2013.01); *D01F 1/103* (2013.01);
(Continued)

(58) Field of Classification Search
CPC .......................... B29C 48/15; B29K 2025/08; B29K 2027/12; B29K 2027/16; B29K 2033/12;
(Continued)

(56) References Cited

U.S. PATENT DOCUMENTS

| | | |
|---|---|---|
| 7,390,760 B1 | 6/2008 | Chen et al. |
| 2016/0193555 A1 | 7/2016 | Park |
| 2022/0243363 A1* | 8/2022 | Wong ................... D01D 5/0069 |

FOREIGN PATENT DOCUMENTS

| | | | |
|---|---|---|---|
| CN | 101868290 A | 10/2010 | |
| CN | 101928996 A * | 12/2010 | ............... D01F 1/10 |

(Continued)

OTHER PUBLICATIONS

Translation of CN 101928996 A (published on Dec. 29, 2010).*
Translation of CN 111330355 A (published on Jun. 26, 2020).*

*Primary Examiner* — Leo B Tentoni
(74) *Attorney, Agent, or Firm* — EAGLE IP LIMITED

(57) ABSTRACT

Provided herein are protective masks made with polymer-based materials and methods of forming the materials. Methods of forming the interlaced polymer-based materials comprise applying adhesive to a substrate, electrospinning a first polymer solution onto the substrate from a first group of spinning electrodes, electrospinning a second polymer solution onto the substrate from a second group of spinning electrodes, and applying hot air to dry the polymer-based materials electrospun from the first polymer solution and the second polymer solution to form the interlaced polymer-based materials.

17 Claims, 4 Drawing Sheets

(51) Int. Cl.
  *B32B 37/12* (2006.01)
  *D01D 5/00* (2006.01)
  *D01F 1/10* (2006.01)
  *B29K 25/00* (2006.01)
  *B29K 27/00* (2006.01)
  *B29K 27/12* (2006.01)
  *B29K 33/00* (2006.01)
  *B29K 71/00* (2006.01)
  *B29K 75/00* (2006.01)
  *B29K 79/00* (2006.01)
  *B29K 105/00* (2006.01)

(52) U.S. Cl.
  CPC ...... *B29K 2025/08* (2013.01); *B29K 2027/12* (2013.01); *B29K 2027/16* (2013.01); *B29K 2033/12* (2013.01); *B29K 2071/02* (2013.01); *B29K 2075/00* (2013.01); *B29K 2079/08* (2013.01); *B29K 2105/0005* (2013.01); *B29K 2105/0011* (2013.01); *B29K 2105/0088* (2013.01); *B32B 2037/1253* (2013.01); *D10B 2321/042* (2013.01); *D10B 2321/08* (2013.01); *D10B 2321/121* (2013.01); *D10B 2331/041* (2013.01); *D10B 2331/06* (2013.01); *D10B 2331/10* (2013.01); *D10B 2331/14* (2013.01); *D10B 2401/021* (2013.01); *D10B 2401/13* (2013.01); *D10B 2505/04* (2013.01)

(58) Field of Classification Search
  CPC ............ B29K 2071/02; B29K 2075/00; B29K 2079/08; B29K 2105/0005; B29K 2105/0011; B29K 2105/0088; B32B 37/12; B32B 2037/1253; B32B 37/153; B32B 38/164; D01D 5/003; D01D 5/0038; D01D 5/0069; D01D 5/0084; D01D 10/06; D01F 1/10; D01F 1/103; D10B 2321/042; D10B 2321/08; D10B 2321/121; D10B 2331/041; D10B 2331/06; D10B 2331/10; D10B 2331/14; D10B 2401/021; D10B 2401/13; D10B 2505/04
  USPC ............ 264/103, 171.13, 211, 234, 331.14, 264/331.17, 331.18, 331.21, 464, 465, 264/466, 484; 156/244.17, 244.24, 156/244.25
  See application file for complete search history.

(56) References Cited

FOREIGN PATENT DOCUMENTS

| | | | | |
|---|---|---|---|---|
| CN | 111330355 A | * | 6/2020 | ............ D01D 5/003 |
| JP | 2014144579 A | | 8/2014 | |
| WO | 2021014413 A1 | | 1/2021 | |
| WO | 2021197482 A1 | | 10/2021 | |

* cited by examiner

PROTECTIVE MASKS MADE WITH POLYMER-BASED MATERIALS

CROSS-REFERENCE TO RELATED APPLICATION

This application claims priority to, and the benefit of, U.S. Provisional Application having Ser. No. 63/202,379 filed on Jun. 9, 2021. The entire contents of the foregoing application are hereby incorporated by reference in its entirety for all purposes.

FIELD OF INVENTION

This invention relates to protective masks made with polymer-based materials, and methods of forming the materials.

BACKGROUND OF INVENTION

With the rising levels of air pollutants around the world, the need for effective protective masks is more urgent than ever. Current masks use a wide variety of materials, such as filtration barriers, with varying success. For example, filtration barriers produced by conventional methods cannot effectively filter out particles with various sizes. Accordingly, these is still a great need for improved materials for use in masks, as well as methods for making such materials.

SUMMARY OF INVENTION

In the light of the foregoing background, it is an object of the present invention to provide an alternate method of forming a filtration barrier with high filtration efficiency.

Accordingly, an exemplary embodiment of the present invention is a method of forming an interlaced structure of polymer-based materials, which includes step (1) applying adhesive to a substrate, (2) electrospinning a first polymer solution onto the substrate from a first group of spinning electrodes, (3) electrospinning a second polymer solution onto the substrate from a second group of spinning electrodes, and (4) applying hot air to dry the polymer-based materials electrospun from the first polymer solution and the second polymer solution. The first group of spinning electrodes and the second group of spinning electrodes are located adjacent to each other. Throughout the whole process, the substrate moves in a direction from the first group of spinning electrodes to the second group of spinning electrodes such that a layer of fibers from the first polymer solution is formed on the substrate and a layer of fibers from the second polymer solution is formed on the layer of fibers from the first polymer. An interlaced structure comprising the fibers from the first polymer solution and the fibers from the second polymer solution is formed between the layer of fibers from the first polymer solution and the layer of fibers from the second polymer solution.

In one embodiment, the first polymer solution and the second polymer solution of the above method are stable during electrospinning, resulting in formation of nanofibers and submicron fibers respectively.

In a further embodiment, the submicron fibers interlace with the nanofibers of the above method to form multiple layers for gradient filtration for a face mask.

In a further embodiment, the multiple layers of the above method include a submicron fibrous layer, an interlaced layer comprising submicron fibers and nanofibers, and a nanofibrous layer.

Other example embodiments are discussed herein.

There are many advantages to the present invention. An advantage of the present invention is that a relatively thick layer of nanofibers can be produced while maintaining a relatively strong structure using the support of a microfiber filter. Another advantage of the present invention according to an exemplary embodiment is that layers of interlaced fibers can be used to form a gradient filtration barrier which effectively block external contaminants with various sizes.

DETAILED DESCRIPTION

As used herein and in the claims, "comprising" means including the following elements but not excluding others.

As used herein and in the claims, "microfibers" refers to fibers of micron-scale dimensions, including but not limited to fibers with diameters of 1 μm to 100 μm, in some embodiments, 1 μm to 50 μm.

As used herein and in the claims, "submicron fibers" refers to fibers of submicron-scale dimensions, including but not limited to fibers with diameters of 300 nm to 1000 nm, in some embodiments, 300 nm to 400 nm.

As used herein and in the claims, "nanofibers" refers to fibers of nanoscale dimensions, including but not limited to fibers with diameters of 10 nm to 300 nm, in some embodiments, 100 nm to 200 nm.

The present invention provides methods of using electrospinning to fabricate fibers of micron-scale and even nanoscale dimensions. An example of an electrospinning technique is free surface electrospinning, also known as needle-free electrospinning. During the electrospinning process, a substrate, such as a nonwoven fabric, passes along a number of spinning electrodes to collect fibers on its surface. A polymer solution is applied onto the spinning electrodes, resulting in the simultaneous formation of electrified or charged fluid polymer jets on the surface of the spinning electrodes. Polymer fibers are formed by the creation and elongation of these electrified fluid polymer jets.

Figure 1:
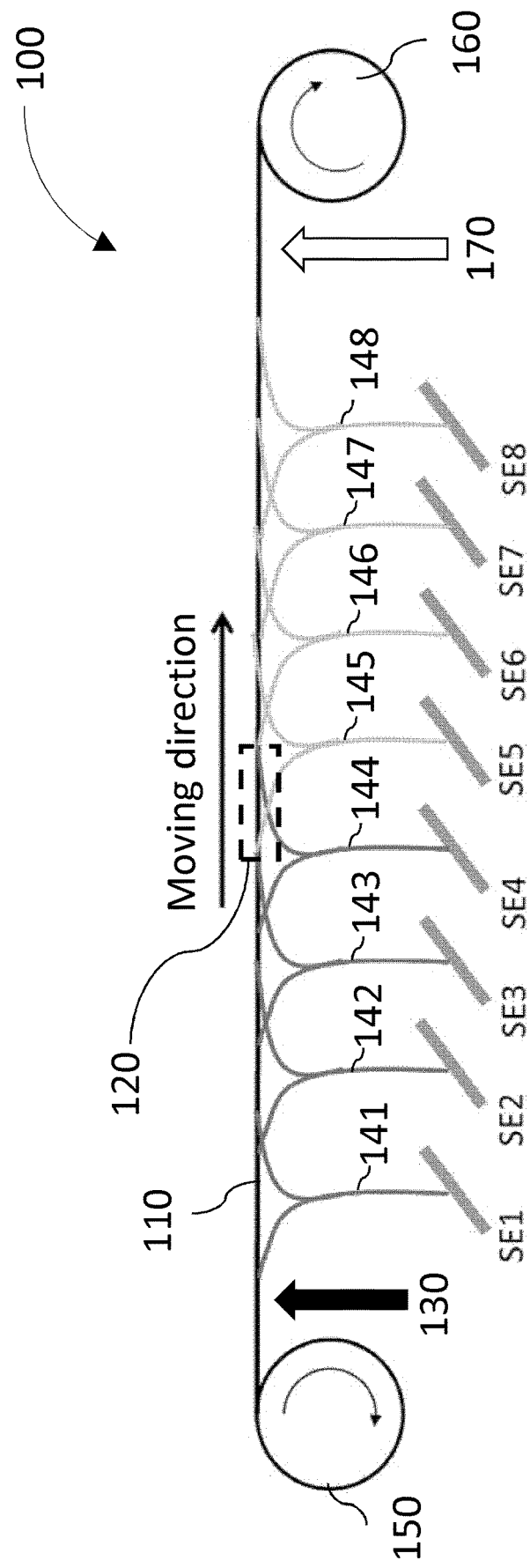
FIG. 1 is a schematic diagram of an electrospinning process in accordance with an example embodiment.

FIG. 1 shows a free spinning electrospinning process for forming multiple layers of fibrous coating in accordance with an example embodiment. An unwinding system 150 unwinds a substrate 110. Prior to the electrospinning process, an adhesive 130 is applied to the substrate 110. The substrate 110 moves horizontally along an electrospinning system 100, passes a numbers of spinning electrodes (SE1 to SE8) to collect fibers on its surface, and is rewound by the rewinding system 160.

In one example embodiment, the spinning electrodes include a first group of spinning electrodes and a second group of spinning electrodes. In one example embodiment, the first group of spinning electrodes (SE) consists of four spinning electrodes SE1-SE4, and the second group of spinning electrodes consists of four spinning electrodes SE5-SE8. The first group of spinning electrodes and the second group of spinning electrodes are located adjacent to each other as shown in FIG. 1, such that SE4 and SE5 are located next to each other in proximity. The substrate 110 moves along the electrospinning system in a direction from the first group of spinning electrodes to the second group of spinning electrodes.

In one example embodiment, a first polymer solution is applied to the four spinning electrodes SE1-SE4 of the first group of spinning electrodes simultaneously. Electrospinning of the first polymer solution is performed onto the substrate 110, causing the polymer solution to be drawn into a plurality of fibers during the electrospinning process. More specifically, polymer jets 141, 142, 143 and 144 are produced from the four spinning electrodes SE1, SE2, SE3 and SE4 respectively. The polymer jets form fibers after solvent evaporation. The fibers are deposited onto the surface of the substrate 110 to form a layer of fibers from the first polymer solution (the first fibrous layer).

In one example embodiment, the first polymer solution is made of a blend of at least one low dipole moment polymer and at least one high dipole moment polymer such that the fibers produced from the first polymer solution are nanofibers with 10-99 nm in diameter. Examples of low dipole moment polymer include, but are not limited to, polyurethane, poly(vinylidenefluoride-co-chlorotrifluoroethylene), blend of polyethylene oxide and chitosan, polycaprolactone, poly(methylmethacrylate), poly(styrene-co-maleic anhydride), or combinations thereof. Example of high dipole moment polymer includes but not limited to polyimide, polyacrylonitrile, polyvinylpyrrolidone, or combinations thereof.

In one example embodiment, a second polymer solution is applied to the four spinning electrodes SE5-SE8 of the second group of spinning electrodes simultaneously. When the substrate 110 that is deposited with the first fibrous layer moves towards the direction of the second group of spinning electrodes, electrospinning of the second polymer solution is performed onto the substrate 110. Polymer jets 145, 146, 147 and 148 are produced from the four spinning electrodes SE5, SE6, SE7 and SE8 respectively. The polymer jets form fibers after solvent evaporation. The fibers are deposited on the first fibrous layer to form a layer of fibers from the second polymer solution (the second fibrous layer).

In one example embodiment, the second polymer solution is made of a blend of at least one low dipole moment polymer and at least one high dipole moment polymer such that the fibers produced from the second polymer solution are submicron fibers with 300 nm to 1000 nm in diameter. In another embodiment, the submicron fibers are 300 nm to 400 nm in diameter.

In one example embodiment, the first polymer solution or the second polymer solution may include at least one hydrophobic nanoparticle. In a further example embodiment, the first polymer solution or second polymer solution may include at least one biocide capable of killing bacteria on contact. In some embodiments, the first polymer solution and the second polymer solution both include at least one hydrophobic nanoparticle. In some embodiments, the first polymer solution and the second polymer solution both include at least one biocide capable of killing bacteria on contact.

FIG. 1 further illustrates an overlapping region 120 that exists between the polymer jet 144 of the first group of spinning electrodes and the polymer jet 145 of the second group of spinning electrodes. When the substrate 110 passes through the overlapping region 120, an interlaced structure including the fibers from the first polymer solution and the fibers from the second polymer solution is formed between the first fibrous layer and the second fibrous layer. In one example embodiment, the interlaced structure includes nanofibers produced from the first polymer solution and submicron fibers produced from the second polymer solution.

In one example embodiment, before the substrate 110 is rewound by the rewinding system 160 at the end of the electrospinning process, hot air 170 is applied on the substrate to dry the polymer-based materials electrospun from the first polymer solution and the second polymer solution.

Examples of the hydrophobic nanoparticle used in the first polymer solution and the second polymer solution include, but are not limited to, silicon dioxide ($SiO_2$), barium titanate ($BaTiO_3$), Boehmite nanoparticles or combinations thereof.

Examples of the biocide used in the first polymer solution and the second polymer solution include, but are not limited to, Povidone-iodine (PVP-I), benzalkonium chloride, benzethonium chloride, methylbenzethonium chloride, cetalkonium chloride, cetylpyridinium chloride, cetrimonium, cetrimide, dofanium chloride, tetraethyl ammonium bromide, di decyl dimethyl ammonium chloride, domiphen bromide, or combinations thereof.

In one example embodiment, the adhesive used can be a natural adhesive or synthetic adhesive, or combinations thereof. In one example embodiment, the adhesive used can be polyvinyl acetate, ethylene vinyl acetate, polyurethane or combinations thereof.

Figure 2:
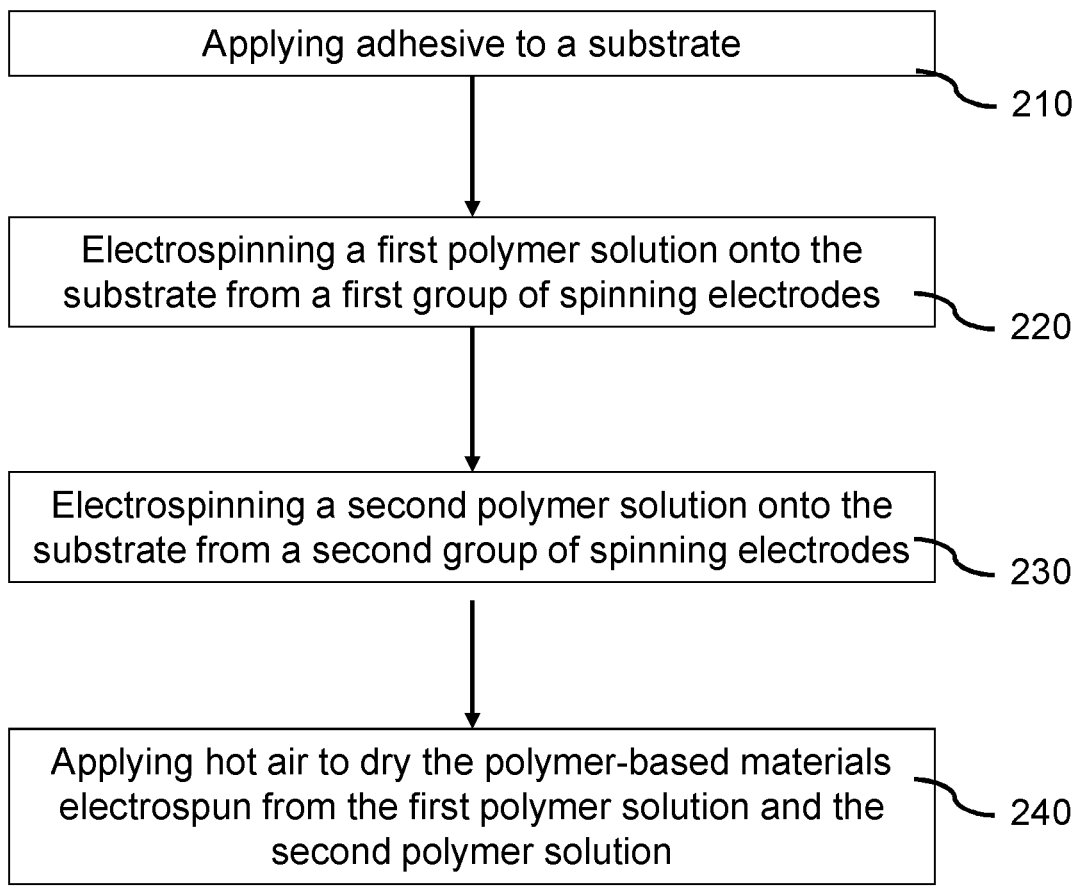
FIG. 2 is a flow diagram of a method of forming an interlaced structure of polymer-based materials in accordance with an example embodiment.

Referring now to FIG. 2, a flow diagram of a method of forming an interlaced structure of polymer-based materials according to an example embodiment is shown, which includes applying adhesive to a substrate (Step 210), electrospinning a first polymer solution onto the substrate from a first group of spinning electrodes (Step 220), electrospinning a second polymer solution onto the substrate from a second group of spinning electrodes (Step 230), and applying hot air to dry the first polymer solution and the second polymer solution (Step 240).

In one example embodiment, the first group of spinning electrodes and the second group of spinning electrodes are located adjacent to each other. Throughout the whole process, the substrate moves in a direction from the first group of spinning electrodes to the second group of spinning electrodes such that a layer of fibers from the first polymer solution is formed on the substrate and a layer of fibers from the second polymer solution is formed on the layer of fibers from the first polymer. An interlaced structure including the fibers from the first polymer solution and the fibers from the second polymer solution is formed between the layer of fibers from the first polymer solution and the layer of fibers from the second polymer solution.

Figure 3A:
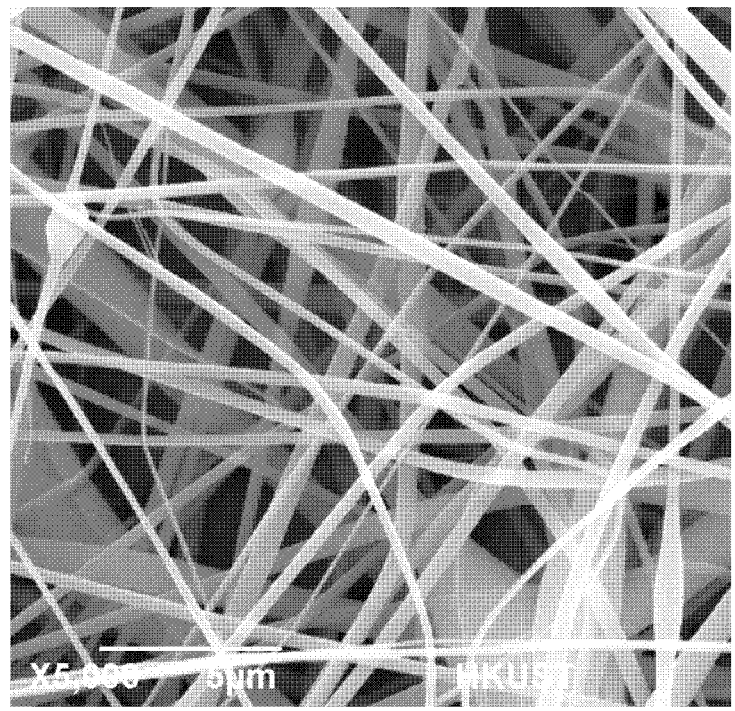
FIG. 3A and FIG. 3B are SEM images of fibers in the interlaced structure in accordance with example embodiments.
Figure 3B:
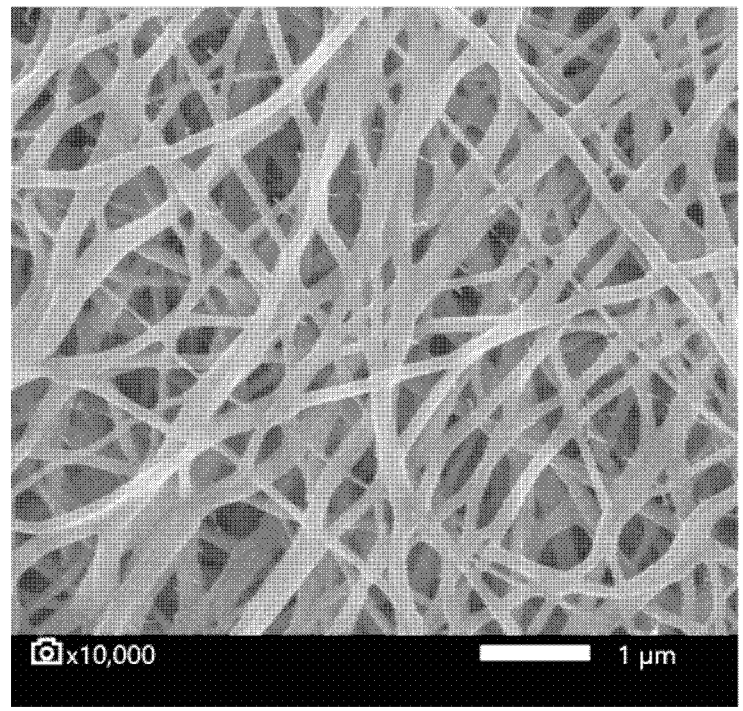

FIGS. 3A and 3B show different fiber morphologies of an interlaced structure of polymer-based materials under Scanning Electron Microscope (SEM) (×5000 magnification and ×10000 magnification respectively) according to different example embodiments. The interlaced structure includes nanofibers interlaced with submicron fibers.

In one example embodiment as shown in FIG. 3A, both the nanofibers and submicron fibers in the interlaced structure are formed without any branches such that the surface of the fibers in the interlaced structure is smooth. In another embodiment as shown in FIG. 3B, the nanofibers and/or submicron fibers in the interlaced structure include nanobranches.

Figure 4:
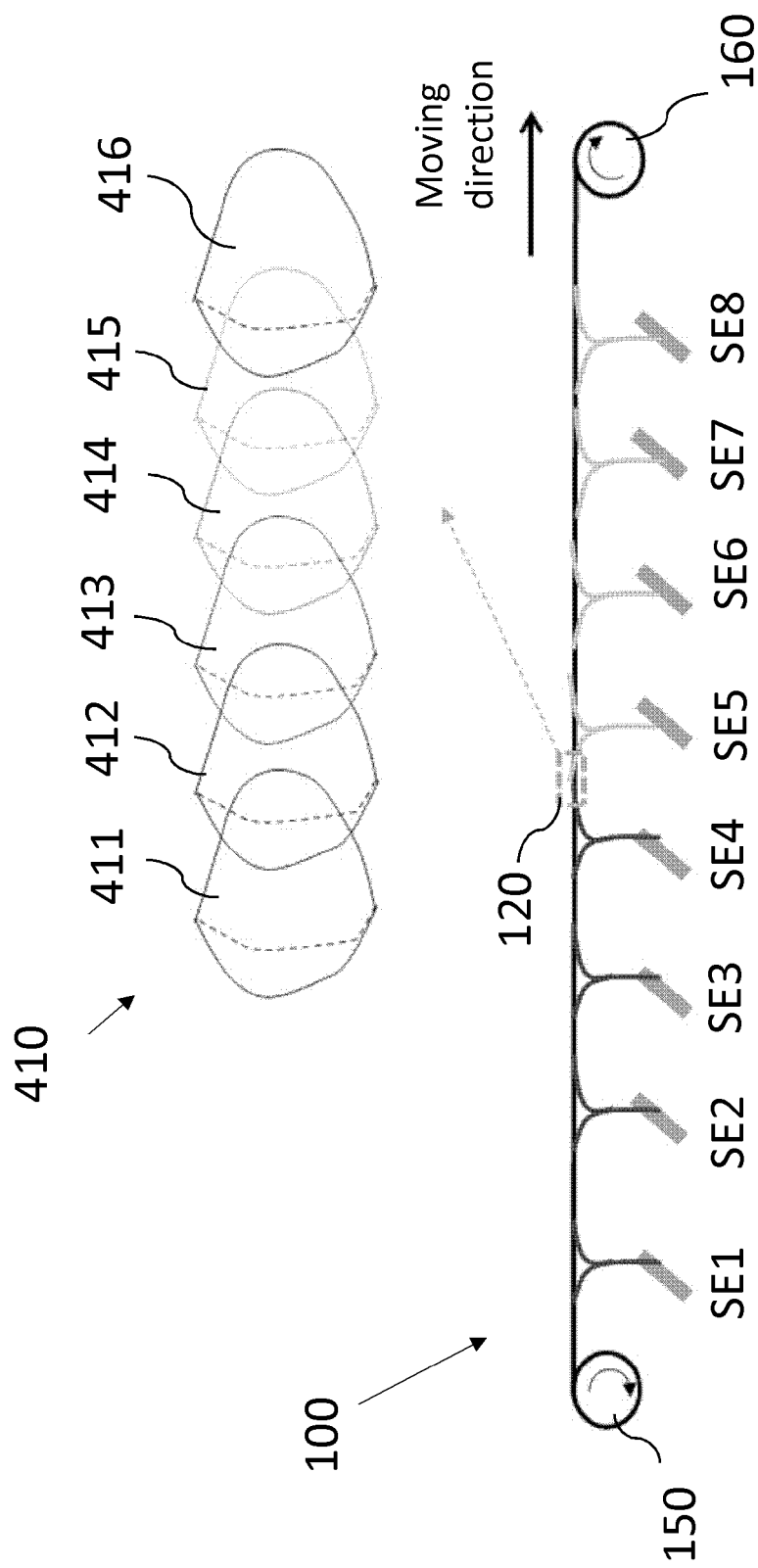
FIG. 4 is a schematic diagram of an electrospinning process to form multiple layers for a facemask in accordance with an example embodiment.

Example 1: Facemask Including Interlaced Structure of Polymer-Based Materials One aspect of this invention, as shown in FIG. 4, relates to a process to form multiple layers for gradient filtration for a facemask 410. In one example embodiment, the multiple layers of facemask 410 include a protective layer 411, a pre-filter layer 412, a submicron fibrous layer 413, an interlaced layer 414 comprising submicron fibers and nanofibers, a nanofibrous layer 415 and a substrate 416.

In one example embodiment, the nanofibrous layer 415, the interlaced layer 414 and the submicron fibrous layer 413 are formed by a first polymer solution and a second polymer solution using the electrospinning process as described in FIG. 1 or herein. In one example embodiment, the first polymer solution is applied to a first group of spinning electrodes SE1-SE4 simultaneously, and the second polymer solution is applied to a second group of spinning electrodes SE5-SE8 simultaneously. In one example embodiment, the first polymer solution and the second polymer solution are stable during electrospinning, resulting in formation of nanofibers and submicron fibers respectively.

Electrospinning is performed on the substrate 416 using the electrospinning system 100 as described in FIG. 1 or herein. In one embodiment, the electrospinning system 100 is a Nanospider with eight spinning electrodes (NS 8S1600U, Elmarco, Czech Republic). In one embodiment, an adhesive is applied on the substrate 416 before electrospinning. During the electrospinning process, the nanofibrous layer 415 is deposited onto the substrate 416. The interlaced layer 414 formed in the overlapping region 120 between the first group of spinning electrodes and the second group of spinning electrodes is attached onto the nanofibrous layer 415 via mechanical interlocking. Moving from the first group of spinning electrodes to the second group of spinning electrodes, the submicron fibrous layer 413 is attached onto the interlaced layer 414 via mechanical interlocking.

The substrate 416 deposited with the nanofibrous layer 415, the interlaced layer 414 and the submicron fibrous layer 413 is rewound by rewinding system 160 positioned at the end of electrospinning system 100. In one example embodiment, the submicron fibrous layer 413 is laminated to the pre-filter layer 412 and the protective layer 411 via a single process of ultrasonic welding. The multiple layers combine together to form a gradient filtration barrier which effectively blocks external pollutants with various sizes.

In one example embodiment, the protective layer 411 is a nonwoven material made of a plurality of microfibers with 10 μm-50 μm in diameter. In a further example embodiment, the microfibers may be produced by spunbonding and are hydrophobic. The protective layer 411 offers protection to the adjacent pre-filter layer 412.

In one example embodiment, the pre-filter layer 412 is a nonwoven material made of a plurality of microfibers with 1 μm-5 μm in diameter. In a further example embodiment, the microfibers are produced by meltblowing and are hydrophobic. In one example embodiment, the microfibers are made of polypropylene. In one example embodiment, the microfibers can be charge-bearing, which allows effective trapping of contaminants by electrostatic attraction, resulting in enhanced filtration efficiency without compromising the breathability of the facemask.

In one example embodiment, the submicron fibrous layer 413 is a nonwoven material made of a plurality of submicron fibers with 300 nm to 1000 nm in diameter. In another embodiment, the submicron fibers are 300 nm to 400 nm in diameter. In a specific example embodiment, the submicron fibers formed by the second polymer solution comprises a blend of at least one low dipole moment polymer and at least one high dipole moment polymer. In one example embodiment, the second polymer solution further comprises at least one hydrophobic nanoparticle. The submicron fibers are superhydrophobic due to the presence of at least one hydrophobic nanoparticle in the second polymer solution. In one example embodiment, the second polymer solution further comprises at least one biocide. The submicron fibrous layer 413 can filter out contaminants greater than about 100 nm in size.

In one example embodiment, the interlaced layer 414 includes an interlaced structure of nanofibers produced from the first polymer solution and submicron fibers produced from the second polymer solution. In a specific example embodiment, the first polymer solution and the second polymer solution comprise a blend of at least one low dipole moment polymer and at least one high dipole moment polymer. In one example embodiment, the first polymer solution and the second polymer solution further comprises at least one hydrophobic nanoparticle. In one example embodiment, the submicron fibers and the nanofibers are superhydrophobic. In one example embodiment, the first polymer solution and the second polymer solution further comprise at least one biocide. The interlaced layer 414 can filter out contaminants greater than about 50 nm in size.

In one example embodiment, the nanofibrous layer 415 is a nonwoven material made of a plurality of nanofibers with 10 nm to 300 nm in diameter. In another embodiment, the nanofibers are 100 nm to 200 nm in diameter. In a specific example embodiment, the nanofibers formed by the first polymer solution comprises a blend of at least one low dipole moment polymer and at least one high dipole moment polymer. In one example embodiment, the first polymer solution further comprises at least one hydrophobic nanoparticle. In one example embodiment, the nanofibers are superhydrophobic. In one example embodiment, the first polymer solution further comprises at least one biocide. The nanofibrous layer 415 can filter out contaminants greater than about 10 nm in size.

In one example embodiment, the substrate 416 is a nonwoven material made of a plurality of microfibers with 10 μm-50 μm in diameter. In a further example embodiment, the microfibers are produced by spunbonding and are hydrophobic. In one example embodiment, the microfibers are made of polypropylene.

In one example embodiment, the multiple layers of the facemask 400 possess antibacterial function, in some embodiments, due to the presence of biocides.

In one example embodiment, the submicron fibrous layer 413, the interlaced layer 414 and the nanofibrous layer 415 can filter out more than 95% of both non-oil based and oil-based contaminants having a size greater than 10 nm.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, the facemask is described in FIG. 4 as having six layers (a protective layer, a pre-filter layer, a submicron fibrous layer, an interlaced layer, a nanofibrous layer and a substrate), but it is clear that some layers may be omitted or some additional layers may be included according to the user's preference in different applications.

What is claimed is:

1. A method of forming an interlaced structure of polymer-based materials, comprising:
    applying adhesive to a substrate;
    electrospinning a first polymer solution onto said substrate from a first group of spinning electrodes;
    electrospinning a second polymer solution onto said substrate from a second group of spinning electrodes, wherein said first group of spinning electrodes and said second group of spinning electrodes are located adjacent to each other, and
    applying hot air to dry the polymer-based materials electrospun from said first polymer solution and said second polymer solution;
    wherein throughout the whole process, said substrate moves in a direction from the first group of spinning electrodes to the second group of spinning electrodes such that a layer of fibers from the first polymer solution is formed on said substrate and a layer of fibers from the second polymer solution is formed on said layer of fibers from the first polymer;
    whereby an interlaced structure comprising the fibers from the first polymer solution and the fibers from the second polymer solution is formed between the layer of fibers from the first polymer solution and the layer of fibers from the second polymer solution.

2. The method of claim 1, wherein the first group of spinning electrodes consists of four spinning electrodes and the first polymer solution is applied to said four spinning electrodes simultaneously.

3. The method of claim 1, wherein the second group of spinning electrodes consists of four spinning electrodes and the second polymer solution is applied to said four spinning electrodes simultaneously.

4. The method of claim 1, wherein the first polymer solution comprises a blend of at least one low dipole moment polymer and at least one high dipole moment polymer such that the electrospinning produces nanofibers with 10 nm to 300 nm in diameter from the first polymer solution.

5. The method of claim 4, wherein the electrospinning produces nanofibers with 100 nm to 200 nm in diameter.

6. The method of claim 4, wherein the first polymer solution further comprises at least one biocide.

7. The method of claim 4 or claim 6, wherein the first polymer solution further comprises at least one hydrophobic nanoparticle.

8. The method of claim 1, wherein the second polymer solution comprises at least one low dipole moment polymer and at least one high dipole moment polymer such that the electrospinning produces submicron fibers with 300 nm to 1000 nm in diameter, from the second polymer solution.

9. The method of claim 8, wherein the electrospinning produces submicron fibers with 300 nm to 400 nm in diameter.

10. The method of claim 8, wherein the first polymer solution further comprises at least one biocide.

11. The method of claim 8 or claim 10, wherein the first polymer solution further comprises at least one hydrophobic nanoparticle.

12. The method of claim 4 or claim 8, wherein the low dipole moment polymer is selected from the group consisting of polyurethane, poly(vinylidenefluoride-co-chlorotrifluoroethylene), blend of polyethylene oxide and chitosan, polycaprolactone, poly(methylmethacrylate), and poly(styrene-co-maleic anhydride), and the high dipole moment polymer is polyimide.

13. The method of claim 1, wherein the first polymer solution and the second polymer solution are stable during electrospinning, resulting in formation of nanofibers and submicron fibers respectively.

14. The method of claim 13, wherein said submicron fibers interlace with said nanofibers to form multiple layers for gradient filtration for a face mask.

15. The method of claim 14, wherein said multiple layers comprise a submicron fibrous layer, an interlaced layer comprising submicron fibers and nanofibers, and a nanofibrous layer.

16. The method of claim 15, wherein said multiple layers possess antibacterial function.

17. The method of claim 16, wherein the submicron fibrous layer, the interlaced layer and the nanofibrous layer can filter out more than 95% of both non-oil based and oil-based contaminants having sizes of more than 10 nm.

* * * * *